United States Patent [19]

Sugawara et al.

[11] Patent Number: 5,147,917
[45] Date of Patent: Sep. 15, 1992

[54] HALOGENATED RESIN COMPOSITION

[75] Inventors: Yuji Sugawara, Kuwana; Shinji Kobe, Omiya, both of Japan

[73] Assignee: Asahi Denka Kogyo Kabushiki Kaisha, Tokyo, Japan

[21] Appl. No.: 654,026

[22] Filed: Feb. 12, 1991

[30] Foreign Application Priority Data

Mar. 15, 1990 [JP] Japan .................................. 2-65154

[51] Int. Cl.$^5$ .......................... C08K 5/13; C08K 5/41; C08K 5/07; C08K 3/10
[52] U.S. Cl. .................................. 524/357; 524/400; 524/424; 524/425
[58] Field of Search ................ 524/357, 400, 424, 425

[56] References Cited

U.S. PATENT DOCUMENTS

| | | | |
|---|---|---|---|
| 3,310,522 | 3/1967 | Takahashi et al. | 524/425 |
| 3,615,811 | 2/1968 | Barrett | 524/424 |
| 3,714,042 | 1/1973 | Greenough | 252/33.2 |
| 3,764,571 | 10/1973 | Jennings et al. | 252/400 |
| 4,097,547 | 6/1978 | Cleveland et al. | 524/424 |
| 4,102,839 | 7/1978 | Crochemore et al. | 524/357 |
| 4,123,399 | 10/1978 | Gay | 524/357 |
| 4,177,187 | 12/1979 | Bohen | 252/406 |
| 4,252,698 | 2/1981 | Ito et al. | 524/425 |
| 4,272,427 | 6/1981 | Davis et al. | 524/424 |
| 4,659,764 | 4/1987 | Isao et al. | 524/400 |

Primary Examiner—Kriellion S. Morgan
Attorney, Agent, or Firm—Young & Thompson

[57] ABSTRACT

A halogenated resin composition whose heat stability, weatherability, initial coloration, thermal coloration and adhesiveness are improved by adding thereto an overbased alkaline earth metal carboxylate/carbonate complex together with a β-diketone compound or a metal salt thereof.

9 Claims, No Drawings

HALOGENATED RESIN COMPOSITION

BACKGROUND OF THE INVENTION

1. Field of the Invention

This invention relates to a halogenated resin composition which is stabilized by adding thereto a specific stabilizer system. More particularly, it relates to a halogenated resin composition whose heat stability, weatherability, initial coloration, thermal coloration and adhesiveness are improved by adding thereto an overbased alkaline earth metal carboxylate/carbonate together with a β-diketone compound or a metal salt thereof.

2. Description of the Prior Art

It is known that a halogenated resin, which is less stable to heat and light, would frequently undergo decomposition mainly caused by dehydrohalogenation in a thermal molding step or when used at a relatively high temperature or upon exposure to ultraviolet rays, for example, outdoor usage.

Thus attempts have been made to improve the stability of a halogenated resin by adding several heat stabilizers such as metal salts of organic acids, inorganic basic metal compounds, organotin compounds, organic phosphite compounds, epoxy compounds or β-diketone compounds thereto.

Among these heat stabilizers, metal salts of organic acids have been used as a fundamental stabilizer for halogenated resins. Further, there has been already proposed the use of a metal salt of an organic acid, wherein a metal base is used in a stoichiometrically excessive amount (i.e., so-called "overbased complex"), as described in, for example, Japanese Patent Publication No. 49019/1977.

Although these stabilizers comprising metal salts of organic acids are effective in the improvement of the heat stability over a prolonged period of time, they are disadvantageous from the viewpoint of coloration, in particular, coloration in the initial stage of heating or after the completion of heating.

It is further known that β-diketone compounds are stabilizers which can mainly improve coloration. There has been proposed in, for example, Japanese Patent Publication No. 8786/1967, Japanese Patent Laid-Open No. 34939/1976, Japanese Patent Laid-Open No. 95447/1976 and Japanese Patent Laid-Open No. 9847/1978 the use of a β-diketone compound or a metal salt thereof and a metal soap.

Although these β-diketone compounds are effective in the improvement of coloration, they are less effective in the improvement of heat stability over a prolonged period of time.

Thus Japanese Patent Publication No. 6465/1982 has proposed to use a β-diketone compound or a metal complex salt thereof together with an overbased alkali metal or alkaline earth metal organic sulfonate or phenolate complex to thereby simultaneously improve the heat stability and the coloration.

Recently, the use of halogenated resins have been diversified and thus the processing conditions and the environment of use therefor have become more and more severe, which makes the stabilizing effect of known stabilizers insufficient. Further, there has been frequently observed the use of a composite material comprising a halogenated resin and a different kind of material, for example, a metal. However a conventional compounding system has only a limited adhesiveness to a different kind of material and, as a result, readily peels off, which results in an additional disadvantage.

Thus it has been urgently required to find out a stabilizer system for a halogenated resin whereby not only the heat stability at a processing temperature and coloration of the halogenated resin but also the heat stability at a relatively high temperature of approximately 100° C. (i.e., the so-called heat aging characteristics) and the adhesiveness to a different kind of material can be improved.

SUMMARY OF THE INVENTION

Under these circumstances, the present inventors have conducted extensive studies in order to find out a stabilizer whereby not only a halogenated resin can be stabilized over a long time even under severe conditions of use but also the adhesiveness thereof to a different kind of material can be improved. As a result, they have found out that a halogenated resin composition excellent in heat stability, coloration and adhesiveness can be obtained by adding an overbased alkaline earth metal carboxylate/carbonate and a β-diketone compound or a metal salt thereof to a halogenated resin.

Accordingly, the present invention provides a stabilized halogenated resin composition which comprises 100 parts by weight of a halogenated resin and, added thereto, (a) 0.05 to 10 parts by weight of at least one overbased alkaline earth metal carboxylate/carbonate and (b) 0.001 to 5 parts by weight of at least one β-diketone compound or a metal salt thereof.

DETAILED DESCRIPTION OF THE INVENTION

The overbased alkaline earth metal carboxylate/carbonate to be used in the present invention is a compound which is schematically represented by the following formula:

wherein
R represents an organic carboxylic acid residue;
M represents an alkaline earth metal; and
x represents the excessive amount of the metal and is a positive number exceeding 0.

Examples of the alkaline earth metal represented by M herein include barium, calcium, magnesium and strontium. x generally ranges from 0.1 to 60, preferably from 0.5 to 30, though it is not particularly restricted as long as it exceeds 0. Examples of the organic acid residue represented by R include residues of monocarboxylic acids such as caproic acid, caprylic acid, pelargonic acid, 2-ethylhexylic acid, capric acid, neodecanoic acid, undecylenic acid, lauric acid, myristic acid, palmitic acid, stearic acid, isostearic acid, 12-hydroxystearic acid, chlorostearic acid, 12-ketostearic acid, phenylstearic acid, ricinolic acid, linoleic acid, linolenic acid, oleic acid, arachic acid, behenic acid, erucic acid, brassidic acid and similar acids, mixtures of the above-cited acids with natural acids such as tallow fatty acids, coconut oil fatty acids, tung oil fatty acids, soybean oil fatty acids and cottonseed oil fatty acids, benzoic acid, p-t-butylbenzoic acid, ethylbenzoic acid, isopropylbenzoic acid, toluic acid, xylylic acid, naphthenic acid and cyclohexanecarboxylic acid.

The overbased alkaline earth metal carboxylate/carbonate to be used in the present invention is a compound schematically represented by the formula $R_2M.xMCO_3$, as described above. However it completely differs from a mere mixture comprising a normal alkaline earth metal carboxylate and an alkaline earth metal carbonate. It is formulated into a complex through some interaction between the components thereof and characterized in that it is in the form of a homogeneous liquid while maintaining a high alkaline earth metal content.

Since the overbased alkaline earth metal carboxylate/carbonate of the present invention is in the form of a complex as described above, it can exert an excellent stabilizing effect which a mere mixture thereof can never achieve.

The overbased alkaline earth metal carboxylate/carbonate to be used in the present invention may be produced by a known method, for example, by reacting the above-mentioned organic carboxylic acid with a stoichiometrically excessive amount of an alkaline earth metal carbonate; by reacting an organic carboxylic acid with a stoichiometrically excessive amount of an alkaline earth metal oxide or hydroxide and then treating the resulting product with carbon dioxide; or by reacting a normal organic carboxylate of an alkaline earth metal with an alkaline earth metal carbonate. The overbased alkaline earth metal carboxylate/carbonate thus produced is characterized by, for example, the metal and acid used, the content of the metal and metal ratio. The term "metal ratio" as used herein means the ratio of the total stoichiometric equivalent of the metal contained in the salt to the equivalent of the metal required for forming a neutral salt and correspond to x (as defined in the above formula) +1.

The following Synthetic Examples show simple examples of the synthesis of the overbased alkaline earth metal carboxylate/carbonate to be used in the present invention.

SYNTHETIC EXAMPLE 1

Overbased Barium Oleate/Carbonate 41 g of anhydrous barium hydroxide was slowly added to 300 g of methyl cellosolve and dissolved therein. Next, 11 g of oleic acid and a mixture of 10 g of nonyl phenol with 36 g of an alkylbenzene solvent were added thereto followed by stirring for approximately 30 minutes. Then the mixture was allowed to react while blowing carbon dioxide into the reaction system and the temperature was slowly elevated to 150° C. while removing the water thus formed. After dehydrating and removing the methyl cellosolve under reduced pressure, overbased barium oleate/carbonate (Ba=32%, metal ratio=12) was obtained as a brown viscous product.

SYNTHETIC EXAMPLE 2

Overbased Barium Octoate/Carbonate 34 g of anhydrous barium hydroxide was slowly added to 480 g of methyl cellosolve and dissolved therein. Next, 6 g of octylic acid and a mixture of 20 g of nonylphenol with 34 g of an alkylbenzene solvent were added thereto followed by stirring for approximately 30 minutes. Then the mixture was allowed to react while blowing carbon dioxide into the reaction system and the temperature was slowly elevated to 150° C. while removing the water thus formed. After dehydrating and removing the methyl cellosolve under reduced pressure, overbased barium octoate/carbonate (Ba=28%, metal ratio=10) was obtained as a brown viscous product.

SYNTHETIC EXAMPLE 3

Overbased Calcium Oleate/Carbonate 30 g of calcium hydroxide was suspended in 300 g of methanol and the obtained suspension was allowed to react while blowing carbon dioxide into the reaction system at 15° C. Next, 11 g of oleic acid and a mixture of 10 g of nonylphenol with 63 g of an alkylbenzene solvent were added thereto and the mixture was allowed to react by slowly elevating the temperature to 150° C. while removing the methanol and the water thus formed. After dehydrating under reduced pressure, overbased calcium oleate/carbonate (Ca=13%, metal ratio=20) was obtained as a pale brown viscous product.

The overbased alkaline earth metal carboxylate/carbonate to be used in the present invention may be easily produced by the above-mentioned methods. Alternately, various commercially available complexes may be used as such therefor. Typical examples of these commercially available complexes are LZ-2116 (overbased barium oleate/carbonate; specific gravity=1.47, Ba=34%) and LZ-2117 (overbased calcium oleate/carbonate; specific gravity=1.07, Ca=14.2%), each a product of Lubrizol Corp., USA.

Such an overbased alkaline earth metal carboxylate/carbonate may be added in an amount of from 0.05 to 10 parts by weight, preferably from 0.1 to 5 parts by weight, per 100 parts by weight of the halogenated resin.

Examples of the $\beta$-diketone compound to be used in the present invention include dehydroacetic acid, acetyltetralone, benzoyltetralone, 2-benzoylcyclohexanone, dibenzoylmethane, benzoyl-4-chlorobenzoylmethane, bis(4-methylbenzoyl)methane, 4-tert-butylbenzoyl-4-methoxybenzoylmethane, benzoyl-4-isopropylbenzoylmethane, bis(4-methoxybenzoyl)methane, acetylbenzoylmethane, acetylbenzoylallylmethane, propionyl-3-methoxycarbonylbenzoylmethane, isovaleroylbenzoylmethane, octanoylbenzoylmethane, palmitoylbenzoylmethane, stearoylbenzoylmethane, dipivaloymethane and distearoylmethane. Further, metal (for example, lithium, sodium, potassium, magnesium, calcium, barium or zinc) salts of these $\beta$-diketone compounds are similarly available in the present invention.

Such a $\beta$-diketone compound or a metal salt thereof may be used in an amount of from 0.001 to 5 parts by weight, preferably from 0.01 to 3 parts by weight, per 100 parts by weight of the halogenated resin.

Examples of the halogenated resin to be stabilized in the present invention include vinyl chloride homopolymer, copolymers of vinyl chloride with ethylene, propylene, vinyl acetate, (meth)acrylate, maleic anhydride, phenylmaleimide or cyclohexylmaleimide, polyvinylidene chloride, polyvinyl bromide, chlorinated polyethylene, graft polymer of vinyl chloride with ethylene/vinyl acetate copolymer and graft polymer of vinyl chloride with a urethane resin having an unsaturated group, each produced by a known method, for example, suspension polymerization, block polymerization or emulsion polymerization. Further, mixtures of these polymers with other thermoplastic resins are also available.

As a matter of course, the composition of the present invention may further contain metal (Li, Na, K, Ca, Ba, Mg, Sr, Zn, Cd, Sn, Cs, Al, or organic Sn) salts of carboxylic acids, organic phosphorus acids or phenols. Examples of said carboxylic acids include caproic acid, caprylic acid, pelargonic acid, 2-ethylhexylic acid, capric acid, neodecanoic acid, undecylenic acid, lauric acid, myristic acid, palmitic acid, stearic acid, isostearic acid, 12-hydroxystearic acid, chlorostearic acid, 12-ketostearic acid, phenylstearic acid, ricinolic acid, linoleic acid, linolenic acid, oleic acid, arachic acid, behenic acid, erucic acid, brassidic acid and similar acids, mixtures of the above-cited acids with natural acids such as tallow fatty acids, coconut oil fatty acids, tung oil fatty acids, soybean oil fatty acids and cottonseed oil fatty acids, benzoic acid, p-t-butylbenzoic acid, ethylbenzoic acid, isopropylbenzoic acid, toluic acid, xylylic acid, salicylic acid, 5-t-octylsalicylic acid, naphthenic acid and cyclohexanecarboxylic acid. Examples of said organic phosphorus acids include mono- or dioctylphosphoric acid, mono- or di-dodecylphosphoric acid, mono- or dioctadecylphosphoric acid, mono- or di-(nonylphenyl)phosphoric acid, nonyl phosphonate and stearyl phosphonate. Examples of said phenols include phenol, cresol, ethylphenol, cyclohexyl-phenol, nonylphenol and dodecylphenol.

Such a metal salt may be used in an amount of preferably from 0.05 to 10 parts by weight per 100 parts by weight of the halogenated resin.

The composition of the present invention may further contain various additives commonly used as additives for halogenated resins, for example, organic phosphite compounds and/or epoxy compounds and plasticizer.

Examples of said organic phosphite compounds include triphenyl phosphite, tris(nonylphenyl) phosphite, tris(mono- and di-mixed nonylphenyl) phosphite, diphenyl decyl phosphite, diphenyl tridecyl phosphite, phenyl dioctyl phosphite, phenyl diisodecyl phosphite, phenyl di(tridecyl) phosphite, tridecyl phosphite, dibutyl acid phosphite, dilauryl acid phosphite, diphenyl acid phosphite, di(nonylphenyl) acid phosphite, distearyl pentaerythritol diphosphite, di(tridecyl) pentaerythritol diphophite, phenyl-4,4'-isopropylidenediphenol pentaerythritol diphosphite, tetra (C$_{12-15}$ mixed alkyl)-4,4'-isopropylidenediphenyl diphosphite and hydrogenated 4,4'-isopropylidenediphenol polyphosphite.

Such an organic phosphite may be used in an amount of preferably from 0.01 to 5 parts by weight per 100 parts by weight of the halogenated resin.

Examples of said epoxy compounds include epoxidized animal and vegetable oils such as epoxy soybean oil, epoxy linseed oil, epoxidized tung oil, epoxidized fish oil, epoxidized beef tallow oil and epoxidized safflower oil, methyl epoxystearate, butyl epoxystearate, 2-ethylhexyl epoxystearate, stearyl epoxystearate, epoxidized polybutadiene, tris(epoxypropyl) isocyanurate, epoxidized tall oil fatty acid ester, epoxidized linseed oil fatty acid ester, bisphenol A diglycidyl ether, vinycyclohexene diepoxide, dicyclohexene diepoxide and 3,4-epoxycyclohexylmethyl epoxycyclohexanecarboxylate.

Examples of said plasticizer include phthalate plasticizers such as diheptyl phthalate, dioxtyl phthalate and diisononyl phthalate, adipate plasticizers such as dioctyl adipate, diisononyl adipate and di(butyldiglycol) adipate, phsphate plasticizers, polyester plasticizers, chlorinated paraffin plasticizers and trimellitate plasticizers.

In addition, the composition of the present invention may further contain various additives commonly used in chlorinated vinyl resins, for example, crosslinking agent, filler, foaming agent, antistatic, antifogging agent, plate-out inhibitor, surface treatment, lubricant, flame-retardant, fluorescent agent, mildewproofing agent, bactericide, sequestering agent, mold releasing agent, pigment, processing aid, antioxidant, light stabilizer, seolites, powdery silicate (silica), perchlorates such as sodium perchlorate, magnesium perchlorate and barium perchlorate and hydrotalcites such as synthetic hydrotalcite, zinc-modified hydrotalcite and perchloric acid-treated (zinc-modified) hydrotalcite.

The composition of the present invention may be used regardless of the processing method of the halogenated resin. For example, it is highly applicable to calendering, rolling, extrusion molding, pressure molding, paste processing and powder molding.

To further illustrate the present invention, and not by way of limitation, the following Examples will be given.

EXAMPLE 1

The composition as specified below was kneaded on a roll at 180° C. for 7 minutes and then pressed at 170° C. for 5 minutes to thereby form a sheet of 0.5 mm in thickness.

Test pieces were cut from this sheet and then subjected to the following tests.

For comparison, pieces prepared by the same method as the above-mentioned one except that the LZ-2116 was replaced by LZ-2106 (a product of Lubrizol Corp., USA; overbased barium nonylphenate/carbonate) were similarly tested.

Table 1 shows the results.

(1) Initial coloration:
The yellowness of a test piece was measured.
(2) Heat stability:
A test piece was heated in a Geer oven at 190° C. and the time required for blackening was measured.
(3) Adhesiveness:
A vinyl acetate adhesive was applied to the aluminum face of a polyester film metallized with aluminum. Next, a test piece was adhered thereto and preserved at 70° C. and a relative humidity of 98% for several days. Then the adhesion of the test piece to the aluminum foil was observed. The result was evaluated in ten grades [1 (no peeling) ←→ 10 (easy peeling of the whole test piece)].

| (Composition) | part by weight |
|---|---|
| polyvinyl chloride resin | 95 |
| (Zeon 103 EP-8, a product of Nippon Zeon) | |
| acrylic impact resistance modifier | 5 |
| (Kaneace B-31, a product of Kanegafuchi Chemical Industry) | |
| dioctyl phthalate | 8 |
| octyl epoxystearate | 4 |
| zinc stearate | 0.2 |
| barium stearate | 0.5 |
| zinc benzoate | 0.2 |
| phenyl di(tridecyl) phosphite | 1.5 |
| LZ-2116*[1] | 0.5 |
| β-diketone compound | 0.4 |

*[1]: a product of Lubrizol Corp., USA, overbased barium oleate/carbonate.

TABLE 1

| No. | β-Diketone compound | Initial coloration | Heat stability (min) | Adhesiveness 5 days | 10 days | 20 days |
|---|---|---|---|---|---|---|
| Comp. Ex. | LZ-2106 compound system | | | | | |
| 1-1 | none | 26.8 | 70 | 4 | 7 | 10 |
| 1-2 | dibenzoylmethane | 22.7 | 85 | 4 | 7 | 10 |
| 1-3 | stearoylbenzoylmethane | 23.5 | 90 | 4 | 7 | 10 |
| Comp. Ex. | LZ-2116 compound system | | | | | |
| 1-4 | none | 26.4 | 80 | 3 | 6 | 10 |
| Ex. | | | | | | |
| 1-1 | dibenzoylmethane | 17.6 | 120 | 1 | 1 | 3 |
| 1-2 | stearoylbenzoylmethane | 17.5 | 120 | 1 | 1 | 3 |
| 1-3 | 3-methoxycarbonyl-benzoylpropionylmethane | 17.2 | 120 | 1 | 3 | 5 |
| 1-4 | dehydroacetic acid | 18.9 | 115 | 1 | 3 | 6 |
| 1-5 | zinc dehydroacetate | 18.4 | 110 | 1 | 2 | 6 |

EXAMPLE 2

By using the composition as specified below, test pieces were prepared in the same manner as the one described in Example 1. Then the heat stability and adhesiveness of the obtained test piece were tested in the same manner as the one described in Example 1. In the case of the initial coloration test, the whiteness of the test piece was measured.

| (Composition) | part by weight |
|---|---|
| polyvinyl chloride resin (Zeon 103 EP-8, a product of Nippon Zeon) | 95 |
| acrylic impact resistance modifier (Kaneace B-31, a product of Kanegafuchi Chemical Industry) | 5 |
| dioctyl phthalate | 8 |
| octyl epoxystearate | 4 |
| zinc stearate | 0.2 |
| barium stearate | 0.5 |
| zinc benzoate | 0.2 |
| tetra($C_{12-15}$ alkyl)bisphenol A diphosphite | 1.5 |
| calcium carbonate | 5 |
| stearoylbenzoylmethane | 0.4 |
| sample compound | 0.5 |

TABLE 2

| No. | Sample compound | Initial coloration | Heat stability (min) | Adhesiveness 5 days | 10 days | 20 days |
|---|---|---|---|---|---|---|
| Comp. Ex. | | | | | | |
| 2-1 | barium oleate | 84.5 | 90 | 4 | 8 | 10 |
| 2-2 | basic barium oleate | 83.4 | 85 | 4 | 6 | 10 |
| 2-3 | LZ-2106 | 87.7 | 100 | 4 | 7 | 10 |
| 2-4 | barium oleate (0.1) barium carbonate (0.4) | 82.6 | 80 | 5 | 9 | 10 |
| 2-5 | calcium oleate | 83.3 | 75 | 4 | 8 | 10 |
| Ex. | | | | | | |
| 2-1 | LZ-2116 | 92.6 | 120 | 1 | 1 | 3 |
| 2-2 | LZ-2116 | 91.8 | 110 | 1 | 1 | 3 |
| 2-3 | product of Syn. Ex. 1 | 91.3 | 120 | 1 | 2 | 4 |
| 2-4 | product of Syn. Ex. 2 | 91.5 | 115 | 1 | 2 | 5 |
| 2-5 | product of Syn. Ex. 3 | 91.1 | 110 | 1 | 2 | 5 |

EXAMPLE 3

By using the composition as specified below, test pieces were prepared in the same manner as the one described in Example 1. Then the heat stability of the test piece was measured in a Geer oven at 190° C.

In order to evaluate the dynamic heat stability, the time required for the sticking of the compound to the roll (i.e., sticking time) was measured and the extent of coloration (mill colorability) was observed with the lapse of time. The result was evaluated in ten grades [1 (no coloration)↔10 (remarkable coloration)].

For comparison, the LZ-2116 was replaced with LZ-2106 and the obtained pieces were similarly tested.

Table 3 shows the results.

| (Composition) | part by weight |
|---|---|
| polyvinyl chloride resin (Zeon 103 EP-8, a product of Nippon Zeon) | 95 |
| acrylic impact resistance modifier (Kaneace B-31, a product of Kanegafuchi Chemical Industry) | 5 |
| dioctyl phthalate | 8 |
| epoxidized soybean oil | 4 |
| zinc stearate | 0.2 |
| barium stearate | 0.5 |
| zinc benzoate | 0.2 |
| diphenyl tridecyl phosphite | 1.0 |
| LZ-2116 | 0.6 |
| β-diketone compound | 0.4 |

TABLE 3

| No. | β-Diketone compound | Heat stability (min) | Sticking time (min) | Mill colorability 5 days | 10 days | 20 days |
|---|---|---|---|---|---|---|
| Comp. Ex. | LZ-2106 compound system | | | | | |
| 3-1 | none | 60 | 23.5 | 3 | 6 | 9 |
| 3-2 | dibenzoylmethane | 75 | 26.5 | 1 | 3 | 6 |
| 3-3 | stearoylbenzolymethane | 70 | 26.0 | 1 | 4 | 7 |

TABLE 3-continued

| No. | β-Diketone compound | Heat stability (min) | Sticking time (min) | Mill colorability 5 days | 10 days | 20 days |
|---|---|---|---|---|---|---|
| Comp. Ex. | LZ-2116 compound system | | | | | |
| 3-4 | none | 65 | 25.5 | 3 | 5 | 9 |
| Ex. | | | | | | |
| 3-1 | dibenzoylmethane | 105 | 31.5 | 1 | 2 | 3 |
| 3-2 | zinc debenzoylmethane | 100 | 30.0 | 1 | 2 | 3 |
| 3-3 | stearoylbenzoylmethane | 105 | 31.0 | 1 | 2 | 3 |
| 3-4 | isopivaloylbenzoylmethane | 100 | 30.5 | 1 | 2 | 4 |
| 3-5 | dehydroacetic acid | 95 | 30.0 | 1 | 2 | 4 |

EXAMPLE 4

The composition as specified below was kneaded on a roll at 160° C. for 5 minutes and then pressed at 160° C. for 5 minutes to thereby form a sheet of 0.5 mm in thickness.

Test pieces were cut from this sheet and then subjected to the following tests. Table 4 shows the results.

(1) Heat stability:
A test piece was heated in a Geer oven at 190° C. and the time required for blackening was measured.

(2) Thermal coloration:
The coloration of a test piece heated at 190° C. for 60 minutes was evaluated in ten grades 1 (no coloration) ⟵⟶ 10 (remarkable coloration)].

(3) Heat aging characteristics:
A test piece was heated in a Geer oven at 110° C. and the time required for blackening was measured.

| (Composition) | part by weight |
|---|---|
| polyvinyl chloride resin (Zeon 103 EP, a product of Nippon Zeon) | 100 |
| ABS resin (Blendex, a product of Ube Cycon, Ltd.) | 5 |
| di(C$_{9-11}$ alkyl) phthalate | 70 |
| epoxyidized soybean oil | 2 |
| antimony trioxide | 2 |
| zinc stearate | 0.1 |
| barium stearate | 0.2 |
| zinc benzoate | 0.2 |
| barium perchlorate | 0.1 |
| phenyl di(tridecyl) phosphite | 0.6 |
| LZ-2116 | 0.2 |
| β-diketone compound | 0.1 |

EXAMPLE 5

The composition as specified below was kneaded on a roll at 180° C. for 7 minutes and then pressed at 170° C. for 5 minutes to thereby form a sheet of 0.5 mm in thickness.

Test pieces were cut from this sheet and then subjected to the following tests.
Table 5 shows the results.

(1) Heat stability:
A test piece was heated in a Geer oven at 190° C. and the time required for blackening was measured.

(2) Light resistance:
The colorations of test pieces irradiated with light in a fadeometer at a black panel temperature of 83° C. for 10 and 25 days were evaluated in ten grades [1 (no coloration) ⟵⟶ 10 (remarkable coloration)].

(3) Heat aging characteristics:
A test piece was heated in a Geer oven at 110° C. for 2 weeks and the coloration thereof was evaluated in ten grades [1 (remarkable coloration) ⟵⟶ 10 (remarkable coloration)].

| (Composition) | part by weight |
|---|---|
| polyvinyl chloride resin (TK-1300; a product of The Shin-Etsu Chemical) | 100 |
| di(C$_{9-11}$ alkyl) phthalate | 80 |
| chlorinated paraffin | 10 |
| calcium carbonate | 15 |
| epoxidized soybean oil | 4 |
| zinc stearate | 0.4 |
| barium stearate | 0.5 |
| phenyl di(tridecyl) phosphite | 0.5 |
| dibenzoylmethane | 0.05 |
| sample compound | 0.4 |

TABLE 4

| No. | β-Diketone compound | Heat stability (min) | Thermal coloration | Heat aging characteristics (day) |
|---|---|---|---|---|
| Comp. Ex. | LZ-2106 compound system | | | |
| 4-1 | none | 75 | 9 | 16 |
| 4-2 | dibenzoylmethane | 90 | 6 | 19 |
| 4-3 | stearoylbenzoylmethane | 90 | 6 | 18 |
| Comp. Ex. | LZ-2116 compound system | | | |
| 4-4 | none | 80 | 8 | 17 |
| Ex. | | | | |
| 4-1 | dibenzoylmethane | 120 | 3 | 28 |
| 4-2 | zinc dibenzoylmethane | 110 | 3 | 26 |
| 4-3 | stearoylbenzoylmethane | 115 | 3 | 26 |
| 4-4 | isopivaloylbenzoylmethane | 115 | 4 | 25 |
| 4-5 | dehydroacetic acid | 105 | 4 | 25 |

TABLE 5

| No. | Sample compound | Heat stability (min) | Light resistance 10 days | Light resistance 25 days | Heat aging characteristics (day) |
| --- | --- | --- | --- | --- | --- |
| Comp. Ex. | | | | | |
| 5-1 | barium oleate | 75 | 7 | 9 | 9 |
| 5-2 | basic barium oleate | 80 | 4 | 9 | 8 |
| 5-3 | LZ-2106 | 85 | 4 | 7 | 8 |
| 5-4 | barium oleate (0.1) barium carbonate (0.4) | 65 | 7 | 10 | 10 |
| 5-5 | calcium oleate | 70 | 6 | 9 | 9 |
| Ex. | | | | | |
| 5-1 | LZ-2116 | 105 | 2 | 3 | 4 |
| 5-2 | LZ-2117 | 95 | 2 | 3 | 5 |
| 5-3 | product of Syn. Ex. 1 | 100 | 2 | 3 | 4 |
| 5-4 | product of Syn. Ex. 2 | 100 | 2 | 3 | 5 |
| 5-5 | product of Syn. Ex. 3 | 90 | 3 | 4 | 5 |

The results of the above Examples indicate the following facts.

When an overbased phenolate/carbonate, which is an overbased complex other than those to be used in the present invention, was used, the obtained composition showed somewhat improved but yet unsatisfactory heat stability and coloration. In this case, furthermore, the adhesiveness of the obtained product, in particular, to a different kind of material was seriously insufficient. When a basic metal carboxylate was used or a metal carboxylate was used together with a metal carbonate, scarcely any improvement was achieved as compared with a case wherein a conventional metal carboxylate was used. In this case, further, the adhesiveness was seriously poor.

In contrast, the composition of the present invention comprising an overbased metal carboxylate/carbonate together with a β-diketone compound showed not only extremely improved heat stability and coloration but also an excellent adhesiveness to a different kind of material, which clearly shows that the effects of the present invention are remarkably excellent.

What is claimed is:

1. A stabilized halogenated resin composition which comprises 100 parts by weight of a halogenated resin in admixture with (a) 0.05 to 10 parts by weight of at least one overbased alkaline earth metal carboxylate/carbonate complex and (b) 0.001 to 5 parts by weight of at least one β-diketone compound or a metal salt thereof.

2. A halogenated resin composition as claimed in claim 1, wherein said overbased alkaline earth metal carboxylate/carbonate complex is an overbased calcium or barium carboxylate/carbonate complex.

3. A halogenated resin composition as claimed in claim 2, wherein said overbased barium carboxylate/carbonate complex is overbased barium oleate/carbonate complex.

4. A halogenated resin composition as claimed in claim 2, wherein said overbased calcium carboxylate/carbonate complex is overbased calcium oleate/carbonate complex.

5. A halogenated resin composition as claimed in claim 1, wherein said β-diketone compound is dibenzoylmethane.

6. A halogenated resin composition as claimed in claim 1, wherein said β-diketone compound is stearoylbenzoylmethane.

7. A halogenated resin composition as claimed in claim 1, wherein said β-diketone compound is dehydroacetic acid.

8. A halogenated resin composition as claimed in claim 1, which further comprises a zinc carboxylate as an additional stabilizer.

9. A halogenated resin composition as claimed in claim 1, wherein said halogenated resin is a polyvinyl chloride resin.

* * * * *